United States Patent
Takahashi et al.

(10) Patent No.: US 12,001,050 B2
(45) Date of Patent: Jun. 4, 2024

(54) MANUFACTURING METHOD OF MULTICORE FIBER PREFORM, MULTICORE FIBER PREFORM, AND MULTICORE FIBER

(71) Applicant: FURUKAWA ELECTRIC CO., LTD., Tokyo (JP)

(72) Inventors: Masanori Takahashi, Tokyo (JP); Koichi Maeda, Tokyo (JP); Shinichi Arai, Tokyo (JP); Ryuichi Sugizaki, Tokyo (JP); Masayoshi Tsukamoto, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 296 days.

(21) Appl. No.: 17/448,077

(22) Filed: Sep. 20, 2021

(65) Prior Publication Data
US 2022/0003921 A1   Jan. 6, 2022

Related U.S. Application Data

(63) Continuation of application No. PCT/JP2020/009956, filed on Mar. 9, 2020.

(30) Foreign Application Priority Data

Mar. 27, 2019   (JP) .................................. 2019-059982

(51) Int. Cl.
G02B 6/02   (2006.01)
(52) U.S. Cl.
CPC ................................. *G02B 6/02042* (2013.01)

(58) Field of Classification Search
None
See application file for complete search history.

(56) References Cited

U.S. PATENT DOCUMENTS 4,978,377 A * 12/1990 Brehm ............. C03B 37/01231
65/412
5,353,365 A   10/1994 Dumas et al.
(Continued)

FOREIGN PATENT DOCUMENTS

| CN | 1557754 A | 12/2004 |
| CN | 102730960 A | 10/2012 |

(Continued)

OTHER PUBLICATIONS

International Search Report dated May 19, 2020 in PCT/JP2020/009956 filed on Mar. 9, 2020, 3 pages.

(Continued)

*Primary Examiner* — Jerry Rahll
(74) *Attorney, Agent, or Firm* — Oblon, McClelland, Maier & Neustadt, L.L.P.

(57) ABSTRACT

A multicore fiber includes: n pieces of first core regions in a circular shape with a radius r1 that are arranged about points P11 to P1$n$, and that has a first core portion and a first cladding portion; a second core region in a circular shape with a radius R1 that is arranged about the point a1, and that has a second core portion and a second cladding portion; and a cladding region that is formed on an outer circumferences of the first core region and the second core region. Further, abutting surfaces that are flat surfaces abutting on each other are formed in portions on the outer circumferences of the first core region and the second core region.

2 Claims, 7 Drawing Sheets

(56) References Cited

U.S. PATENT DOCUMENTS

| | | | |
|---|---|---|---|
| 5,519,801 A * | 5/1996 | Le Noane | G02B 6/3838 |
| | | | 385/115 |
| 6,272,155 B1 * | 8/2001 | Sekiguchi | G02B 6/06 |
| | | | 385/115 |
| 6,778,747 B1 | 8/2004 | Bhagavatula et al. | |
| 7,107,795 B2 | 9/2006 | Cheo | |
| 2010/0296784 A1 | 11/2010 | Imamura | |
| 2012/0008908 A1 | 1/2012 | Imamura | |
| 2013/0074551 A1 | 3/2013 | Sasaoka | |
| 2013/0239623 A1 | 9/2013 | Rosenkranz et al. | |
| 2013/0298380 A1 | 11/2013 | Mukasa | |
| 2016/0075590 A1 | 3/2016 | Gonda et al. | |

FOREIGN PATENT DOCUMENTS

| | | |
|---|---|---|
| JP | 05-341162 A | 12/1993 |
| JP | 2002-524766 A | 8/2002 |
| JP | 5888966 B2 | 3/2016 |
| WO | WO 2010/073821 A1 | 7/2010 |
| WO | WO 2014/178293 A1 | 11/2014 |

OTHER PUBLICATIONS

Extended European Search Report dated Nov. 25, 2022 in European Patent Application No. 20780062.4, 11 pages.
Nozoe, S., et al., "Ultra-Low Crosstalk 125-µm-Cladding Four-Hole Four-Core Fibers Fabricated by the Over-Cladding Bundled Rods Method", Journal of Lightwave Technology, vol. 37, No. 21, Nov. 1, 2019, pp. 5600-5608.

* cited by examiner

MANUFACTURING METHOD OF MULTICORE FIBER PREFORM, MULTICORE FIBER PREFORM, AND MULTICORE FIBER

CROSS-REFERENCE TO RELATED APPLICATION(S)

This application is a continuation of International Application No. PCT/JP2020/009956, filed on Mar. 9, 2020 which claims the benefit of priority of the prior Japanese Patent Application No. 2019-059982, filed on Mar. 27, 2019, the entire contents of which are incorporated herein by reference.

BACKGROUND

The present disclosure relates to a manufacturing method of a multicore fiber preform, a multicore fiber preform, and a multicore fiber.

A multicore that is an optical fiber having plural core portions has been known. As a manufacturing method of this multicore fiber, a stacking method in which plural core rods having a core portion and a cladding portion formed on an outer circumference of the core portion are arranged inside a glass tube having a circular hole has been known. In the stacking method, the core rods are arranged such that respective core portions are positioned at grid points of a regular hexagon.

The stacking method has a problem that positioning accuracy of a core is low, and that the core becomes non-circular shape (degree of core being non-circular shape is large) because gaps are formed between core rods and between a core rod and a glass tube. As a technique to solve this problem, Japanese Patent No. 5888966 discloses a technique of arranging capillary tubes in a non-circular shape are arranged in a glass tube having a hole in a non-circular shape.

SUMMARY

There is a need for providing a manufacturing method of a multicore fiber preform, a multicore fiber preform, and a multicore fiber that improve the positioning accuracy of cores, reduce the degree of core being non-circular shape, and improve the flexibility in designing.

Solution to Problem

According to an embodiment, a manufacturing method of a multicore fiber rod includes: a preparation step of preparing n pieces of first core rods in a cylindrical shape with a radius r1, having a first core portion and a first cladding portion that is formed on an outer circumference of the first core portion; a second core rod in a cylindrical shape with a radius R1, having a second core portion and a second cladding portion that is formed on an outer circumference of the second core portion; and a cladding in a cylindrical shape. Further, at a portion of outer circumferences of the first core rod and the second core rod, abutting surfaces that are flat surfaces abutting on each other are formed; a hole forming step of setting points P11 to P1$n$ at positions, distances of which are X11 to X1$n$, respectively, from a point a1, on straight lines dividing an end surface into n pieces to have an equal central angle, about the point a1 on the end surface of the cladding such that X1max−r1<R1<X1min is satisfied when a maximum value of X11 to X1$n$ is X1max and a minimum value thereof is X1min, and of forming a first hole in a circular shape with the radius r1 about the points P11 to P1$n$, and a second hole in a circular shape with the radius R1 about the point a1 in the cladding; an insertion step of inserting the first core rod in the first hole, and the second core rod in the second hole; and an integration step of integrating the first core rods, the second core rod, and the cladding by thermal processing.

According to an embodiment, a manufacturing method of a multicore fiber preform includes: a preparation step of preparing n pieces of first core rods in a polygonal shape, having a first core portion and a first cladding portion that is formed on an outer circumference of the first core portion; a second core rod in a polygonal shape, having a second core portion and a second cladding portion that is formed on an outer circumference of the second core portion; and a cladding in a cylindrical shape. Further, in a portion of outer circumferences of the first core rod and the second core rod, abutting surfaces that are flat surfaces abutting on each other are formed; a hole forming step of setting points P21 to P2$n$ at positions, distances of which are X21 to X2$n$, respectively, from a point a2, on straight lines dividing an end surface into n pieces to have an equal central angle, about the point a2 on the end surface of the cladding such that a plurality of overlap portions in which adjacent pieces of the first core rods overlap in at least a part thereof are formed, and of forming a first hole in a polygonal shape to have its center of gravity at the points 21 to P2$n$, and a second hole in a polygonal shape that includes all of the overlap portions, to have its center of gravity at the point a1; an insertion step of inserting the first core rod in the first hole, and the second core rod in the second hole; and an integration step of integrating the first core rods, the second core rod, and the cladding by thermal processing.

According to an embodiment, a multicore fiber preform includes: n pieces of first core rods in a cylindrical shape with a radius r1 that are arranged about points P11 to P1$n$, and that has a first core portion and a first cladding portion formed on an outer circumference of the first core portion, by setting the points P11 to P1$n$ at positions, distances of which are X11 to X1$n$, respectively, from a point a1 on straight lines dividing an end surface into n pieces to have an equal central angle about the point a1 on the end surface such that X1max−r1<R1<X1min is satisfied, when a maximum value of X11 to X1$n$ is X1max, and a minimum value thereof is X1min; a second core rod in a cylindrical shape with a radius R1 that are arranged about the point a1, and that has a second core portion and a second cladding portion formed on an outer circumference of the second core portion; and a cladding that is formed on an outer circumference of the first core rod and the second core rod. Further, abutting surfaces that are flat surfaces abutting on each other are formed in a portion of the outer circumferences of the first core rod and the second core rod.

According to an embodiment, a multicore fiber preform includes: n pieces of first core rods in a polygonal shape, that are arranged to have their center of gravity at points P21 to P2$n$, and that has a first core portion and a first cladding portion formed on an outer circumference of the first core portion, by setting points P21 to P2 such that a plurality of overlap portions in which adjacent pieces of polygons overlap in at least a part thereof are formed at positions, distances of which are X21 to X2$n$, respectively, from the point a2 on straight lines dividing an end surface into n pieces to have an equal central angle, about the point a2 on the end surface; a second core rod in a polygonal shape that is arranged to have its center of gravity at the point a2, that has a second core portion and a second cladding portion formed on an outer circumference of the second core portion, and that includes all of the overlap portions; and a cladding that is formed on the outer circumferences of the first core rod and the second core rod. Further, abutting surfaces that are flat surfaces abutting on each other are formed in a portion of the outer circumferences of the first core rod and the second core rod.

According to an embodiment, a multicore fiber includes: n pieces of first core regions in a circular shape with a radius r1 that are arranged about points P11 to P1$n$, and that has a first core portion and a first cladding portion formed on an outer circumference of the first core portion by setting the points P11 to P1$n$ at positions, distances of which are X11 to X1$n$, respectively, from a point a1, on straight lines dividing an end surface in to n pieces to have an equal central angle about the point a1 of the end surface such that X1max−r1<R1<X1min is satisfied, where a maximum value of X11 to X1$n$ is X1max, and a minimum value thereof is X1min; a second core region in a circular shape with a radius R1 that is arranged about the point a1, and that has a second core portion and a second cladding portion formed on an outer circumference of the second core portion; and a cladding region that is formed on an outer circumferences of the first core region and the second core region. Further, abutting surfaces that are flat surfaces abutting on each other are formed in portions on the outer circumferences of the first core region and the second core region.

According to an embodiment, a multicore fiber includes: n pieces of first core regions in a polygonal shape that are arranged to have a center of gravity at points P21 to P2$n$, and that has a first core portion and a first cladding portion formed on an outer circumference of the first core portion, by setting the points P21 to P2$n$ at positions, distances of which are X21 to X2$n$, respectively, from a point a2, on straight lines dividing an end surface into n pieces to have an equal central angle about the point a2 of the end surface such that a plurality of overlap portions in which adjacent polygons overlap each other at least in a part thereof are formed; a second core region in a polygonal shape that is arranged about the point a1, that has a second core portion and a second cladding portion formed on an outer circumference of the second core portion, and that includes all of the overlap portions; and a cladding region that is formed on an outer circumferences of the first core region and the second core region. Further, abutting surfaces that are flat surfaces abutting on each other are formed in portions on the outer circumferences of the first core region and the second core region.

According to an embodiment, a manufacturing method of a multicore fiber preform includes: a hole forming step of setting points P11 to P1$n$ at positions, distances of which are X11 to X1$n$, respectively, from a point a1, on straight lines dividing an end surface into n pieces to have an equal central angle, about the point a1 on the end surface of the cladding such that X1max−r1<R1<X1min is satisfied when a maximum value of X11 to X1$n$ is X1max, and a minimum value thereof is X1min, and of forming a first hole in a circular shape with a radius r1 about the points P11 to P1$n$, and a second hole in a circular shape with a radius R1 about the point a1 in the cladding; a preparation step of preparing n pieces of first core rods in a cylindrical shape with the radius r1, having a first core portion and a first cladding portion that is formed on an outer circumference of the first core portion; and a second rod having a second cladding portion, the second rod having a size insertable in the second hole in a state in which the first core rod is inserted in the first hole, and having a softening point lower than the first cladding portion and the cladding; an insertion step of inserting the first core rod in the first hole, and the second rod in the second hole; and an integration step of integrating the first core rods, the second rod, and the cladding by thermal processing.

According to an embodiment, a multicore fiber includes: n pieces of first core regions in a circular shape with a radius r1 that are arranged about points P11 to P1$n$, and that have a first core portion and a first cladding portion formed on an outer circumference of the first core portion, by setting the points P11 to P1$n$ at positions, distances of which are X11 to X1$n$, respectively, from a point a1, on straight lines dividing an end surface into n pieces to have an equal central angle about the point a1 of the end surface such that X1max−r1<R1<X1min is satisfied when a maximum value of X11 to X1$n$ is X1max, and a minimum value thereof is X1min; and a low-temperature-softening cladding region that is arranged about the point a1, and that has a softening temperature lower than the first cladding portion.

DETAILED DESCRIPTION

Figure 1:
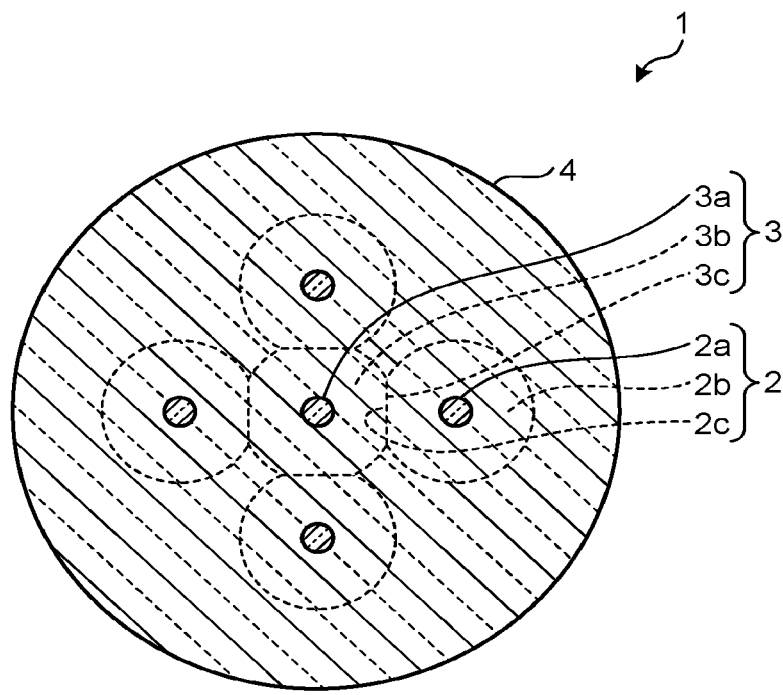
FIG. 1 is a cross-section of a multicore fiber preform that is manufactured by a manufacturing method of a multicore fiber preform according to a first embodiment of the present disclosure.

In the related art, the technique of Japanese Patent No. 5888966 may have a problem that the designing flexibility is low because cores can only be arranged on grid points.

Hereinafter, forms to implement the present disclosure (hereinafter, embodiments) will be explained with reference to the drawings. The embodiments explained below are not intended to limit the present disclosure. Furthermore, in description throughout the drawings, like reference symbols are assigned to like parts. Moreover, the drawings are of schematic illustrations, and a relationship in size of respective components, ratios of the respective components can differ from an actual situation. Furthermore, also among the drawings, portions in which a relationship in size or ratios differ from one another can be included. Moreover, xyz coordinate axes are shown in the drawings, and directions will be explained based on these.

Moreover, in description throughout the drawings, identical reference signs are assigned to identical or corresponding components appropriately. Furthermore, the drawings show schematic illustrations, and it is noted that a relationship in dimensions among respective components, a ratio among the respective components can differ from those in actual situations. Also among the drawings, portions in which a relationship in dimensions thereamong or ratios are different can be included.

First Embodiment

Composition of Multicore Fiber Preform

First, a composition of a multicore fiber preform that is manufactured by a manufacturing method of a multicore fiber preform according to a first embodiment of the present disclosure will be explained. FIG. 1 is a cross-section of a multicore fiber preform that is manufactured by the manufacturing method of a multicore fiber preform according to the first embodiment of the present disclosure. As illustrated in FIG. 1, a multicore fiber preform 1 includes four pieces of first core rods 2, a second core rod 3, and a cladding 4. The first core rods 2, the second core rod 3, and the cladding 4 are integrated by an integration step described later. Although a case of having four pieces of the first core rods 2 is illustrated in FIG. 1, the number of the first core rods 2 is not particularly limited.

The first core rod 2 has a first core portion 2a and a first cladding portion 2b that is formed on an outer circumference of the first core portion 2a. At a part of an outer circumference of the first core rod 2, an abutting surface 2c that is a flat surface abutting on the second core rod 3 is formed.

The second core rod 3 has a second core portion 3a, and a second cladding portion 3b that is formed on an outer circumference of the second core portion 3a. At a part of an outer circumference of the second core rod 3, an abutting surface 3c that is a flat surface abutting on the first core rod 2 is formed. That is, the abutting surface 2c and the abutting surface 3c are flat surfaces abutting on each other.

The first core portion 2a and the second core portion 3a are made from silica based glass having a high refractive index in which, for example, germanium is doped. The refractive indexes of the first core portion 2a and the second core portion 3a may be the same or be different.

The first cladding portion 2b, the second cladding portion 3b, and the cladding 4 are made from a material having a lower refractive index than the first core portion 2a and the second core portion 3a, and are made from, for example, pure silica glass in which no dopant for refractive index adjustment is added, or the like. The refractive indexes of the first cladding portion 2b, the second cladding portion 3b, and the cladding 4 may be the same, or be different from one another.

Figure 2:
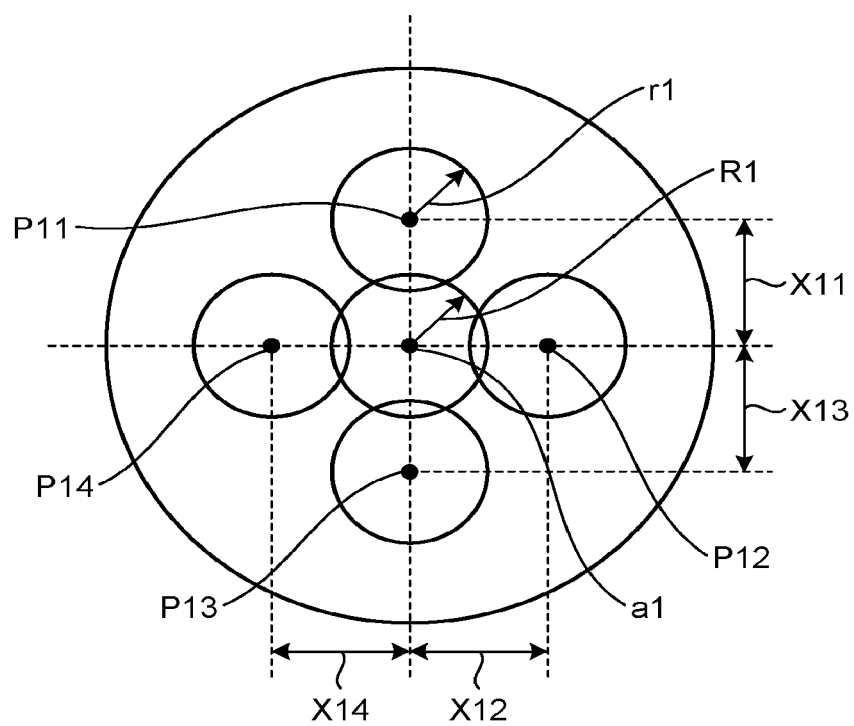
FIG. 2 is a diagram for explaining positional relationship of cores in the multicore fiber preform illustrated in FIG. 1.

FIG. 2 is a diagram for explaining positional relationship of cores in the multicore fiber preform illustrated in FIG. 1. As illustrated in FIG. 2, the multicore fiber preform 1 includes four pieces of the first core rods 2 in a cylindrical shape with a radius r1, the second core rod 3 in a cylindrical shape with a radius R1, and the cladding 4 that is formed on the outer circumference of the first core rod 2 and the second core rod 3.

The first core rods 2 are arranged about points P11, P12, P13, P14, distances of which are X11, X12, X13, X14, respectively from a point a1 on straight lines dividing an end surface equally into four pieces to have an equal central angle (the central angle is 90° in the first embodiment), about the point a1 on the end surface. The distances X11 to X14 are set to satisfy X1max−r1<R1<X1min when the maximum value thereof is X1max and the minimum value thereof is X1min. X11 to X14 may be uniform, or may be different.

The abutting surface 2c and the abutting surface 3c are formed to pass intersection points of a circle around the point a1 with the radius R1, four circles about the points P11 to P14 with the radius r1.

The second core rod 3 is arranged about the point a1. The point a1 is not necessarily arranged at the center of the cladding 4.

Manufacturing Method of Multicore Fiber

Figure 3:
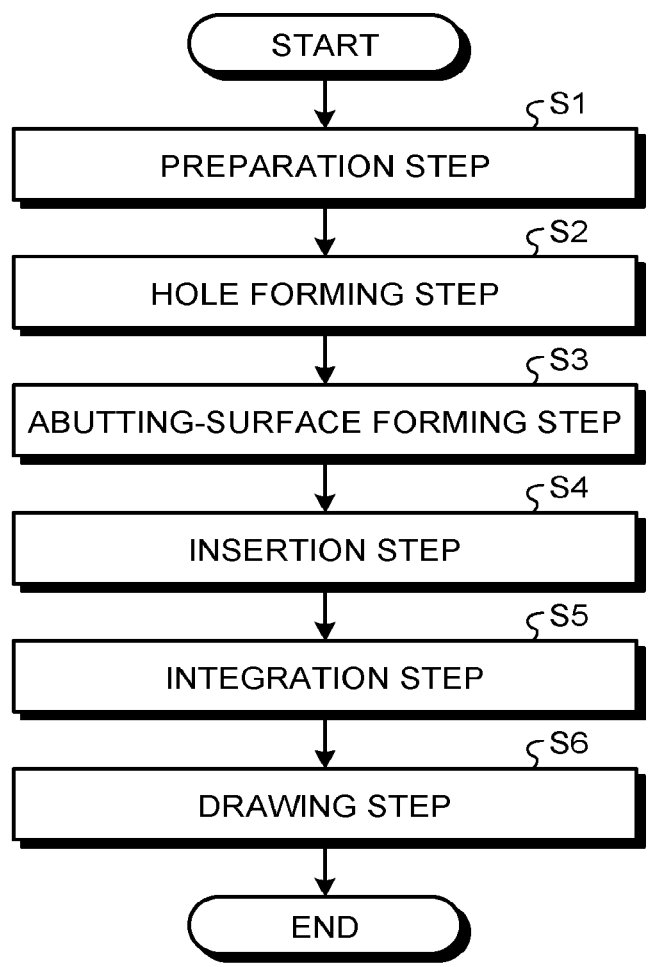
FIG. 3 is a flowchart illustrating a manufacturing method of a multicore fiber.

Next, a manufacturing method of a multicore fiber to manufacture a multicore fiber by drawing the multicore fiber preform 1 manufactured by the manufacturing method of the multicore fiber preform 1 according to the first embodiment of the present disclosure will be explained. FIG. 3 is a flowchart illustrating a manufacturing method of a multicore fiber. By steps S1 to S5 in FIG. 3, the multicore fiber preform 1 is manufactured, and by step 6, a multicore fiber is manufactured by drawing of the multicore fiber preform 1.

First, four pieces of the first core rods 2 in a cylindrical shape with the radius r1 including the first core portion 2a and the first cladding portion 2b that is formed on an outer circumference of the first core portion 2a, the second core rod 3 in a cylindrical shape with the radius R1 including the second core portion 3a and the second cladding portion 3b that is formed on an outer circumference of the second core portion 3a, and the cladding 4 in a cylindrical shape are prepared (step S1: preparation step). The first core rod 2, the second core rod 3, and the cladding 4 can be manufactured by using a known method, such as a vapor phase axial deposition (VAD) method, an outside vapor deposition (OVD) method, and a modified chemical vapor deposition (MCVD) method.

Subsequently, the points P11 to P14 are set so as to satisfy X1max−r1<R1<X1min at positions, distances of which are X11 to X14, respectively, from the point a1 on straight lines dividing an end surface into four pieces to have equal central axes, about the point a1 on the end surface of the cladding 4. First holes in a circular shape around the points P11 to P14 with the radius r1, and a second hole in a circular shape around the point a1 with the radius R1 are formed in the cladding 4 (step S2: hole forming step). The first holes and the second hole are simultaneously formed by applying heat to the cladding 4 in a cylindrical shape. Moreover, by using a particle molding method, the cladding 4 in which the first holes and the second hole are formed in advance may be prepared.

Moreover, at a part of an outer circumference of the first core rods 2 and the second core rod 3, the abutting surface 2c and the abutting surface 3c to abut on each other are formed (step S3: abutting-surface forming step). By grinding a portion of the outer circumference of the first core rod 2 and the second core rod 3 in a cylindrical shape, the abutting surface 2c and the abutting surface 3c are formed. Note that the first core rod 2 and the second core rod 3 in which the abutting surface 2c and the abutting surface 3c are formed in advance by a particle molding method or the like may be prepared. Moreover, the hole forming step and the abutting-surface forming step may be switched in order.

The first core rods 2 are inserted in the first holes, and the second core rod 3 is inserted in the second hole, respectively (step S4: insertion step). Specifically, the first core rods 2 and the second core rod 3 are inserted such that the abutting surface 2*c* formed on the outer circumference of the first core rod 2 and the abutting surface 3*c* formed on the outer circumference of the second core rod 3 abut on each other.

Thereafter, the first core rods 2, the second core rod 3, and the cladding 4 are integrated by thermal processing (step S5: integration step). In the integration step, by heating, for example, by using a heating furnace, gaps among the first core rods 2, the second core rod 3, and the cladding 4 are filled (collapsed), to form into one piece. By omitting the integration step, integration and drawing may be performed at the same time in the drawing step explained next. By the steps explained above, the multicore fiber preform 1 is manufactured.

Figure 4:
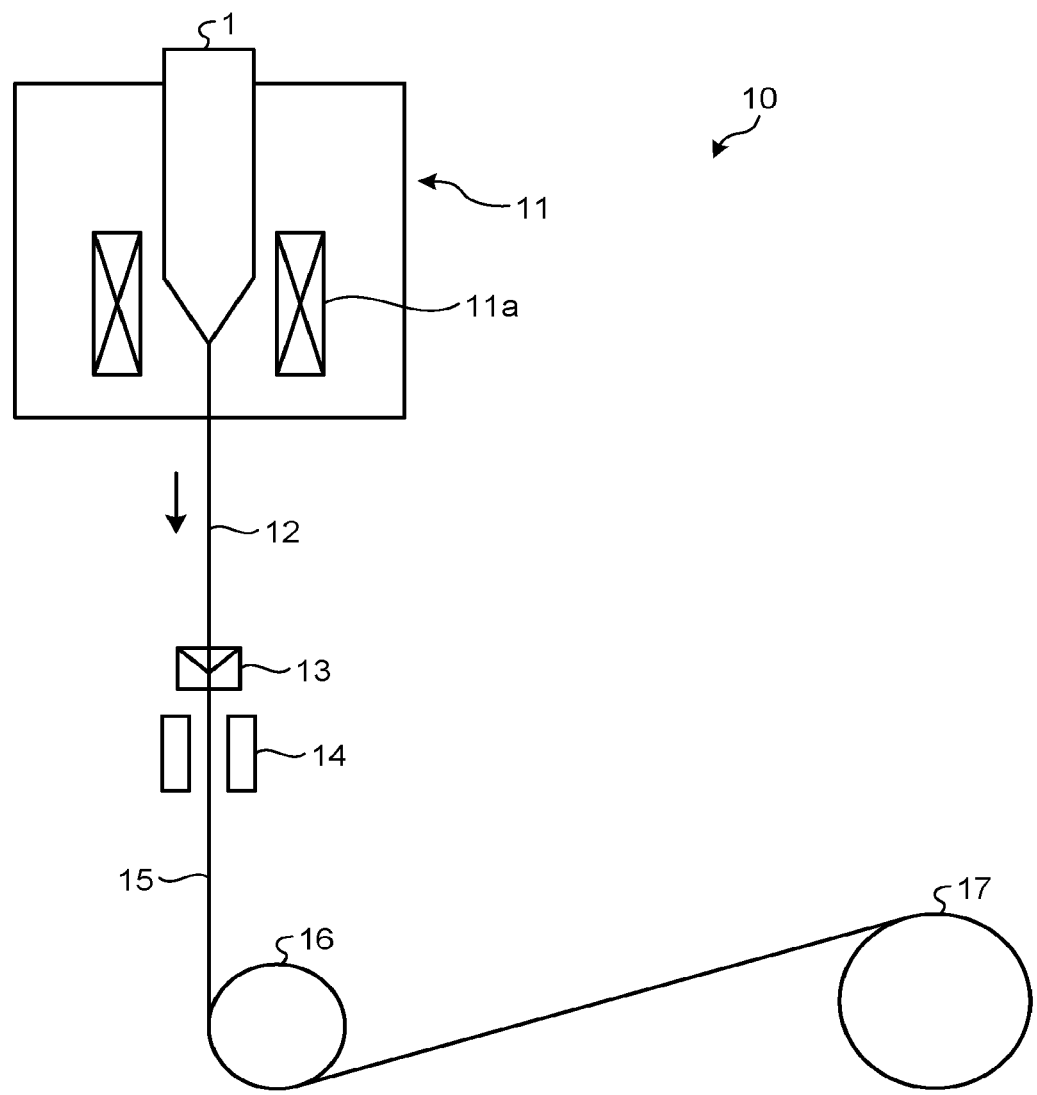
FIG. 4 is a schematic diagram explaining a drawing step.

Subsequently, the multicore fiber preform 1 is drawn (step S6: drawing step). FIG. 4 is a schematic diagram explaining the drawing step. As illustrated in FIG. 4, the multicore fiber preform 1 is set in a drawing furnace 11 of a manufacturing device 10, one end is heated and melted by a heater 11*a* in the drawing furnace 11, and a glass optical fiber 12 is pulled out downward in a vertical direction. Thereafter, an ultraviolet curable resin is applied on an outer circumferential surface of the glass optical fiber by a coating device 13, and an ultraviolet ray is irradiated by an ultraviolet irradiation device 14, to form a multicore fiber 15 that is coated with the applied ultraviolet curable resin thus cured. A guide roller 16 guides the multicore fiber 15 to a winder 17, and the winder 17 winds the multicore fiber 15 on a bobbin. Thus, the multicore fiber 15 is manufactured.

A taper member, a welding portion of which is substantially the same in outer diameter as the multicore fiber preform 1 may be welded at a drawing start end of the multicore fiber preform 1 before setting the multicore fiber preform 1 in the manufacturing device 10. This enables to reduce a manufacturing loss at the beginning of the drawing, and to use most of an assembled preform as a product portion.

Composition of Multicore Fiber

Next, a composition of the multicore fiber 15 that is manufactured by drawing the multicore fiber preform 1 will be explained. Because the multicore fiber 15 has a cross-section similar to that in FIG. 1 although sizes are different, illustration thereof is omitted. That is, the multicore fiber 15 includes four pieces of first core regions (region corresponding to the first core rods 2) having a circular shape with the radius r1 that are arranged about the points P11 to P14, distances of which are X11 to X14, respectively from the point a1 on straight lines dividing an end surface into four pieces to have an equal central angle, about the point a1 on the end surface, and that include the first core portion 2*a* and the first cladding portion 2*b* formed on the outer circumference of the first core portion 2*a*, a second core region (region corresponding to the second core rod 3) having a circular shape with the radius R1 that is arranged at the point a1, and that includes the second core portion 3*a* and the second cladding portion 3*b* formed on the outer circumference of the second core portion 3*a*, and a cladding region (region corresponding to the cladding 4) formed on the outer circumference of the first core region and the second core region. The distances X11 to X14 are set to satisfy X1max−r1<R1<X1min when the maximum value thereof is X1max and the minimum value thereof is X1min. X11 to X14 may be uniform, or may be different.

According to the first embodiment explained above, because the positional relationship of the first core rod 2 and the second core rod 3 satisfies X1max−r1<R1<X1min, a surface, an angle from the center of which is 180° or larger out of the outer circumferential surface of the first core rod 2 abuts on the cladding 4. As a result, positions of the respective first core rods 2 are determined by the cladding 4 and, therefore, the positioning accuracy is higher than a case of the stacking method in which positions of core rods are determined by one another. Furthermore, because there is no gap between the first core rod 2 and the second core rod 3, the degree of core being non-circular shape is small. Moreover, according to the first embodiment, the first core portion 2*a* can be arranged at any position other than grid points and, therefore, the design flexibility is high.

Second Embodiment

Composition of Multicore Fiber Preform

Figure 5:
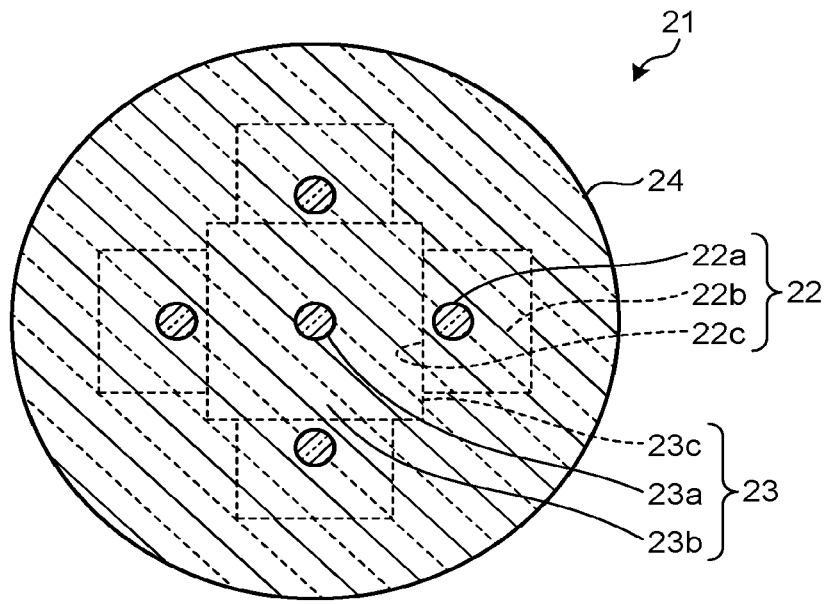
FIG. 5 is a cross-section of a multicore fiber preform that is manufactured by a manufacturing method of a multicore fiber preform according to a second embodiment of the present disclosure.

Next, a composition of a multicore fiber preform that is manufactured by a manufacturing method of a multicore fiber preform according to a second embodiment of the present disclosure will be explained. FIG. 5 is a cross-section of a multicore fiber preform that is manufactured by the manufacturing method of a multicore fiber preform according to the second embodiment of the present disclosure. As illustrated in FIG. 5, a multicore fiber preform 21 includes four first core rods 22, a second core rod 23, and a cladding 24. The first core rods 22, the second core rod 23, and the cladding 24 are integrated by an integration step described later. Although a case of having four pieces of the first core rods 22 is illustrated in FIG. 5, the number of the first core rods 22 is not particularly limited.

The first core rod 22 has a first core portion 22*a* and a first cladding portion 22*b* that is formed on an outer circumference of the first core portion 22*a*. In the first core rod 22, an abutting surface 22*c* that is a flat surface abutting on the second core rod 23 is formed.

The second core rod 23 has a second core portion 23*a*, and a second cladding portion 23*b* that is formed on an outer circumference of the second core portion 23*a*.

The first core portion 22*a* and the second core portion 23*a* are made from silica based glass having a high refractive index in which, for example, germanium is doped. The refractive indexes of the first core portion 22*a* and the second core portion 23*a* may be the same or be different.

The first cladding portion 22*b*, the second cladding portion 23*b*, and the cladding 24 are made from a material having a lower refractive index than the first core portion 22*a* and the second core portion 23*a*, and are made from, for example, pure silica glass in which no dopant for adjusting the refractive index is added, or the like. The refractive indexes of the first cladding portion 22*b*, the second cladding portion 23*b*, and the cladding 24 may be the same, or be different from one another.

Figure 6:
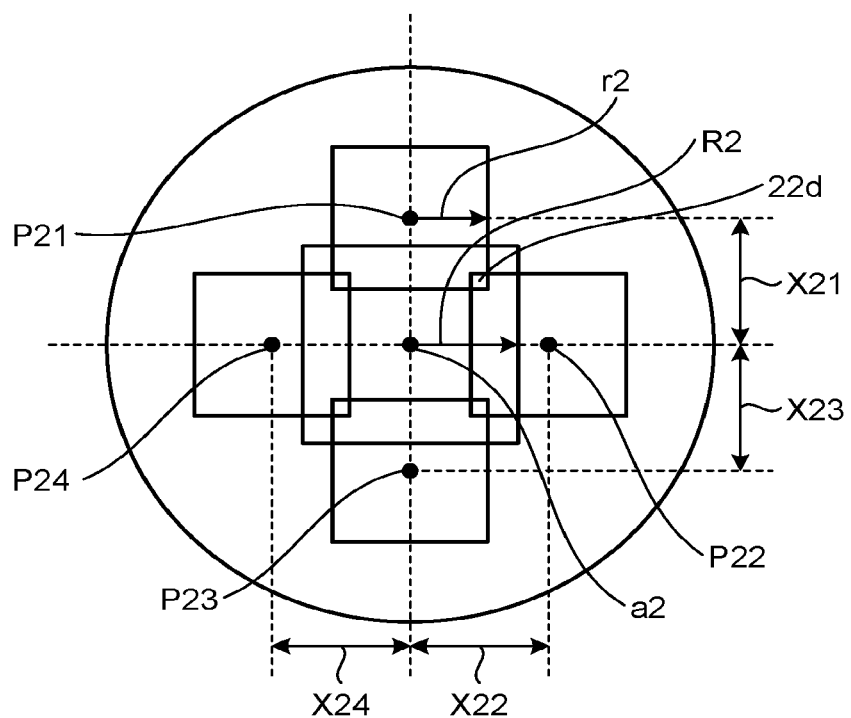
FIG. 6 is a diagram for explaining positional relationship of cores in the multicore fiber preform illustrated in FIG. 5.

FIG. 6 is a diagram for explaining positional relationship of cores in the multicore fiber preform illustrated in FIG. 5. As illustrated in FIG. 6, the multicore fiber preform 21 includes four pieces of the first core rods 22 in a quadrilateral shape in which on surface of an outer circumference is ground, the second core rod 23 in a quadrilateral shape, and the cladding 24 that is formed on the outer circumference of the first core rod 22 and the second core rod 23.

The first core rods 22 are arranged at positions, distances of which are X21, X22, X23, X24, respectively from a point a2 on straight lines dividing an end surface into four pieces to have an equal central angle (the central angle is 90° in the second embodiment), about the point a2 on the end surface, positioning their center of gravity at points P21, P22, P23, P24 that are set to form four overlap portions 22d in which portions of polygons adjacent to each other overlap. X21 to X24 may be uniform, or may be different.

The second core rod 23 is arranged about the point a2, and includes the four overlap portions 22d. The point a2 is not necessarily arranged at the center of the cladding 24.

Manufacturing Method of Multicore Fiber

Next, a manufacturing method of a multicore fiber to manufacture a multicore fiber by drawing the multicore fiber preform 21 manufactured by the manufacturing method of the multicore fiber preform 21 according to the second embodiment of the present disclosure will be explained. Because steps of the manufacturing method of a multicore fiber is same as those in FIG. 3, illustration is omitted.

First, four pieces of the first core rods 22 in a quadrilateral shape including the first core portion 22a and the first cladding portion 22b that is formed on an outer circumference of the first core portion 22a, the second core rod 23 in a quadrilateral shape including the second core portion 23a and the second cladding portion 23b that is formed on an outer circumference of the second core portion 23a, and the cladding 24 in a cylindrical shape are prepared (step S1: preparation step). The first core rod 22, the second core rod 23, and the cladding 24 can be manufactured by using a known method, such as the VAD method, the OVD method, and the MCVD method. Moreover, the first core rod 22 and the second core rod 23 may be manufactured by grinding a cylindrical core rod.

Subsequently, the points P21 to P24 are set such that the four overlap portions 22d in which at least portions of the first core rods 22 adjacent to each other overlap at positions, distances of which are X21 to X24, respectively from the point a2 on straight lines dividing an end surface into four pieces to have an equal central angle, about the point a2 on the end surface of the cladding 24, and a first holes of polygons, the centers of gravity of which are the points P21 to P24 and a second hole of a polygon that includes all of the four overlap portions 22d, and the center of gravity of which is the point a2 are formed (step S2: hole forming step). The first holes and the second hole are simultaneously formed by applying heat to the cladding 24 in a cylindrical shape. Moreover, by using a particle molding method, or the like, the cladding 24 in which the first holes and the second hole are formed in advance may be prepared.

Moreover, at a part of an outer circumference of the first core rods 22, the abutting surface 22c that is a flat surface abutting on an abutting surface 23c of the second core rod 23 is formed (step S3: abutting-surface forming step). By grinding one side of the outer circumference of the quadrilateral shaped first core rod 22, the abutting surface 22c is formed. Note that the first core rod 22 in which the abutting surface 22c is formed in advance by a particle molding method or the like may be prepared. Moreover, the hole forming step and the abutting-surface forming step may be switched in order. As described, when at least a part of the outer circumference of the first core rod 22 or the second core rod 23 is a flat surface, an abutting surface may be formed on either one of the first core rod 22 or the second core rod 23.

The first core rods 22 is inserted in the first holes, and the second core rod 23 is inserted in the second hole, respectively (step S4: insertion step). Specifically, the first core rods 22 and the second core rod 23 are inserted such that the abutting surface 22c formed on the outer circumference of the first core rod 2 abuts on the outer circumference of the second core rod 23.

Thereafter, the first core rods 22, the second core rod 23, and the cladding 24 are integrated by thermal processing (step S5: integration step). In the integration step, by heating, for example, by using a heating furnace, gaps among the first core rods 22, the second core rod 23, and the cladding 24 are filled (collapsed), to form into one piece. By omitting the integration step, integration and drawing may be performed at the same time in the drawing step explained next. By the steps explained above, the multicore fiber preform 21 is manufactured.

Subsequently, the multicore fiber preform 21 is drawn (step S6: drawing step). As explained using FIG. 4, the multicore fiber preform 21 is set in the drawing furnace 11 of a manufacturing device 10, one end is heated and melted by the heater 11a in the drawing furnace 11, and a glass optical fiber 12 is pulled out downward in a vertical direction. Thereafter, an ultraviolet curable resin is applied on an outer circumferential surface of the glass optical fiber 12 by a coating device 13, and an ultraviolet ray is irradiated by the ultraviolet irradiation device 14, to form the multicore fiber 15 that is coated with the applied ultraviolet curable resin thus cured. The guide roller 16 guides the multicore fiber 15 to the winder 17, and the winder 17 winds the multicore fiber 15 on a bobbin. Thus, the multicore fiber 15 is manufactured.

Composition of Multicore Fiber

Next, a composition of the multicore fiber 15 that is manufactured by drawing the multicore fiber preform 21 will be explained. Because the multicore fiber 15 has a cross-section similar to that in FIG. 5 although sizes are different, illustration thereof is omitted. That is, in the multicore fiber 15, the points P21 to P24 are set such that the four overlap portions 22d in which at least a portion of polygons adjacent to each other overlap are formed about the point a2 on an end surface at positions, distances of which are X21 to X24, respectively from the point a2, on straight lines dividing then end surface into four pieces to have an equal central angle, about the point a2 of the end surface, and the multicore fiber 15 includes four first core regions (region corresponding to the first core rods 22) in a polygonal shape that are arranged about the points P21 to P24, and that has the first core portion 22a and the first cladding portion 22b formed on the outer circumference of the first core portion 22a, and a second core region (corresponding to the second core rod 23) in a polygonal shape including all of the four overlap portions 22d that is arranged about the point a2, and that includes the second core portion 23a and the second cladding portion 23b formed on the outer circumference of the second core portion 23a, and a cladding region (corresponding to the cladding 24) that is formed on outer circumferences of the first core region and the second core region. X21 to X24 may be uniform, or may be different.

According to the second embodiment explained above, positions of the respective first core rods 22 and the second core rod 23 are determined by the cladding 24 and, therefore, the positioning accuracy is high. Furthermore, because there is no gap between the first core rod 22 and the second core rod 23, the degree of core being non-circular shape is small. Moreover, according to the second embodiment, the first core portion 22a can be arranged at any position other than grid points and, therefore, the design flexibility is high.

Third Embodiment

Composition of Multicore Fiber Preform

Figure 7:
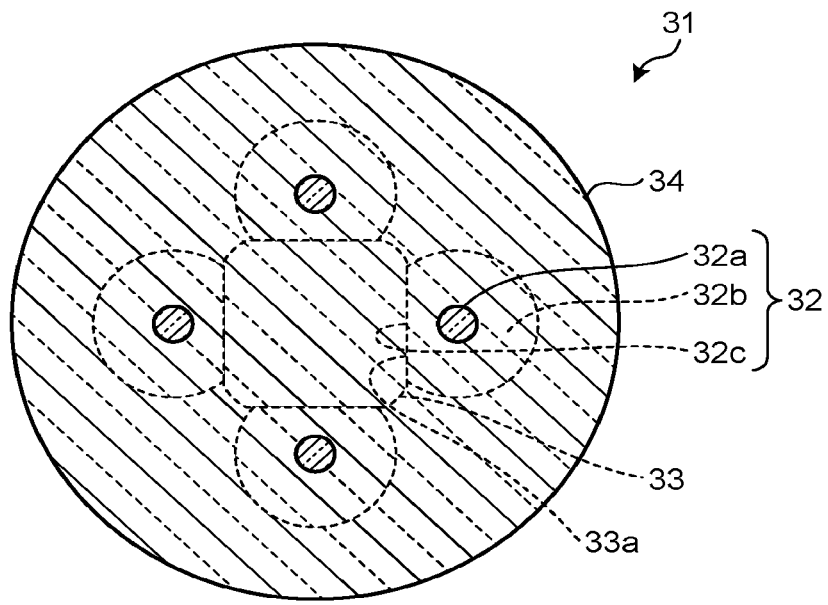
FIG. 7 is a cross-section of a multicore fiber preform that is manufactured by a manufacturing method of a multicore fiber preform according to a third embodiment of the present disclosure.

Next, a composition of a multicore fiber preform manufactured by a manufacturing method of a multicore fiber preform according to a third embodiment of the present disclosure will be explained. FIG. 7 is a cross-section of a multicore fiber preform that is manufactured by a manufacturing method of a multicore fiber preform according to the third embodiment of the present disclosure. As illustrated in FIG. 7, a multicore fiber preform 31 includes four first core rods 32, a cladding rod 33, and a cladding 34. The first core rods 32, the cladding rod 33, and the cladding 34 are integrated by the integration step described later. Although a case of having four pieces of the first core rods 32 is illustrated in FIG. 7, the number of the first core rods 32 is not particularly limited.

The first core rod 32 has a first core portion 32a and a first cladding portion 32b that is formed on an outer circumference of the first core portion 32a. In a part of an outer circumference of the first core rod 32, a flat surface 32c is formed.

The cladding rod 33 has no core portion, and the refractive index is uniform. On an outer circumference of the cladding rod 33, four flat surfaces 33a are formed.

The first core portion 32a is made from a silica based glass having a high refractive index in which, for example, germanium is doped.

The first cladding portion 32b, the cladding rod 33, and the cladding 34 are made from a material having a lower refractive index than the first core portion 32a, and are made from, for example, pure silica glass in which no dopant for refractive index adjustment is added, or the like. The refractive indexes of the first cladding portion 32b, the cladding rod 33, and the cladding 34 may be the same, or be different from one another.

Manufacturing Method of Multicore Fiber

Next, a manufacturing method of a multicore fiber to manufacture a multicore fiber by drawing the multicore fiber preform 31 manufactured by the manufacturing method of the multicore fiber preform 31 according to the third embodiment of the present disclosure will be explained. Because steps other than the abutting-surface forming step are same as those of the first embodiment, explanation will be omitted.

After performing steps S1 to S2 similarly to the first embodiment, in place of the abutting-surface forming step, the flat surface 32c is formed at a portion of the outer circumference of the first core rod 32, and the four flat surfaces 33a are formed on the outer circumference of the cladding rod 33 (step S3': flat-surface forming step). Moreover, the first core rod 32 in which the flat surface 32c is formed and the cladding rod 33 in which the flat surface 33a is formed in advance by a particle molding method, or the like may be prepared.

The first core rods 32 is inserted in the first holes, and the cladding rod 33 is inserted in the second hole, respectively (step S4: insertion step). Specifically, the first core rods 22 and the cladding rod 33 are inserted such that the flat surface 32c of the first core rod 32 and the flat surface 33a of the cladding rod 33 abut on each other. Thereafter, step S5 is performed similarly to the first embodiment, and the multicore fiber preform 31 is manufactured. Furthermore, step S6 is performed similarly to the first embodiment, and the multicore fiber is manufactured.

According to the third embodiment explained above, positions of the respective first core rods 32 and the cladding rod 33 are determined by the cladding 34 and, therefore, the positioning accuracy is high. Furthermore, because there is no gap between the first core rod 32 and the cladding rod 33, the degree of core being non-circular shape is small. Moreover, according to the third embodiment, the first core portion 32a can be arranged at any position other than grid points and, therefore, the design flexibility is high.

Moreover, as the third embodiment, a cladding rod may be arranged in place of the second core rod. Furthermore, the cladding rod 33 may be a cladding rod having a softening temperature lower than the first cladding portion 32b and the cladding 34. The cladding rod 33 can have a lower softening temperature by containing at least one of chlorine, phosphorus, and fluorine. If the cladding rod 33 has a softening temperature lower than the first cladding portion 32b and the cladding 34, the cladding rod 33 is softened earlier in the integration step, to fill the gap among the first core rod 32, the cladding rod 33, and the cladding 34 and, therefore, misalignment is less prone to occur, and the positioning accuracy can further be improved. In the first embodiment and the second embodiment also, a cladding rod may be arranged in place of the first core rod 2 or the first core rod 22, and furthermore, a cladding rod having a lower softening temperature than the first cladding portion and the cladding may be arranged.

First Modification

Figure 8:
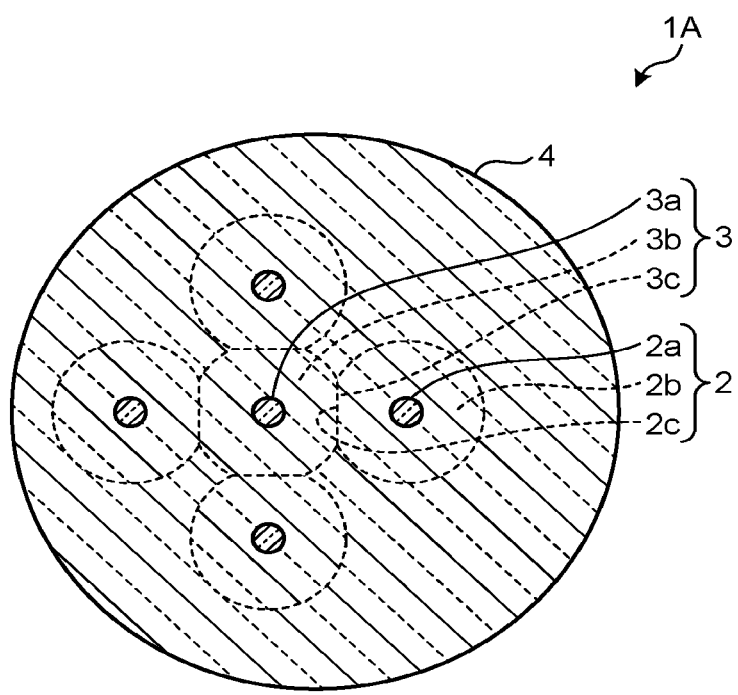
FIG. 8 is a cross-section of a multicore fiber preform according to a first modification.

FIG. 8 is a cross-section of a multicore fiber preform according to a first modification. As a multicore fiber preform 1A illustrated in FIG. 8, the second core portion 3a may be arranged in a decentered manner from the center of the cladding 4. Similarly, in the second embodiment and the third embodiment also, the second core portion 23a or the cladding rod 33 may be arranged in a decentered manner from the center of the cladding 34.

Fourth Embodiment

Composition of Multicore Fiber Preform

Figure 9:
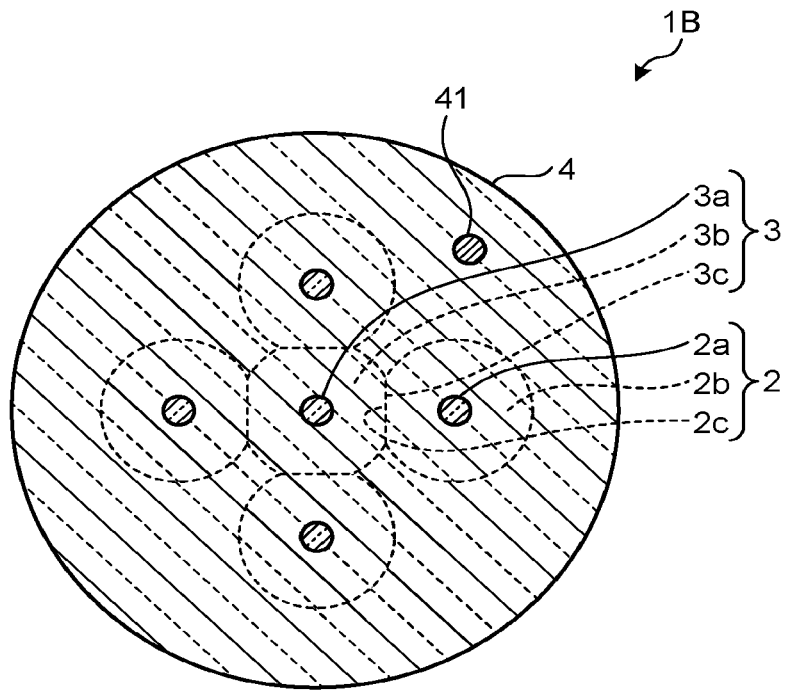
FIG. 9 is a cross-section of a multicore fiber preform that is manufactured by a manufacturing method of a multicore fiber preform according to a fourth embodiment of the present disclosure.

Next, a composition of a multicore fiber preform that is manufactured by a manufacturing method of a multicore fiber preform according to a fourth embodiment of the present disclosure will be explained. FIG. 9 is a cross-section of a multicore fiber preform that is manufactured by the manufacturing method of a multicore fiber preform according to the fourth embodiment of the present disclosure. As illustrated in FIG. 9, a multicore fiber preform 1B includes four first core rods 2, a second core rod 3, a cladding 4, and a marker rod 41. The first core rods 2, the second core rod 3, the cladding 4, and the marker rod 41 are integrated by the integration step. Although a case of having four pieces of the first core rods 2 and one piece of the marker rod is illustrated in FIG. 9, the number of the first core rods 2 or the marker rod 41 is not particularly limited. Moreover, a position in which the marker rod 41 is inserted may be any position. The marker rod 41 is made from a material having a refractive index different from that of the cladding 4 therearound. Other components are identical to the first embodiment.

Manufacturing Method of Multicore Fiber

Next, a manufacturing method of a multicore fiber to manufacture a multicore fiber by drawing the multicore fiber preform 31 manufactured by the manufacturing method of the multicore fiber preform 31 according to the fourth embodiment of the present disclosure will be explained. The manufacturing method of a multicore fiber is same as the first embodiment other than steps of forming a third hole as a third-hole forming step, and a step of inserting the marker rod 41 in the third hole as a marker insertion step. That is, first, the preparation step at step S1 includes the marker preparation step, and a marker rod with a radius Rm or smaller is prepared. Next, the hole forming step at step S2 includes the third-hole forming step, and the third hole with the radius Rm is further formed. The insertion step at step S4 includes a marker insertion step, and the marker rod 41 is inserted in the third hole. Other steps are same as those of the first embodiment.

Figure 10:
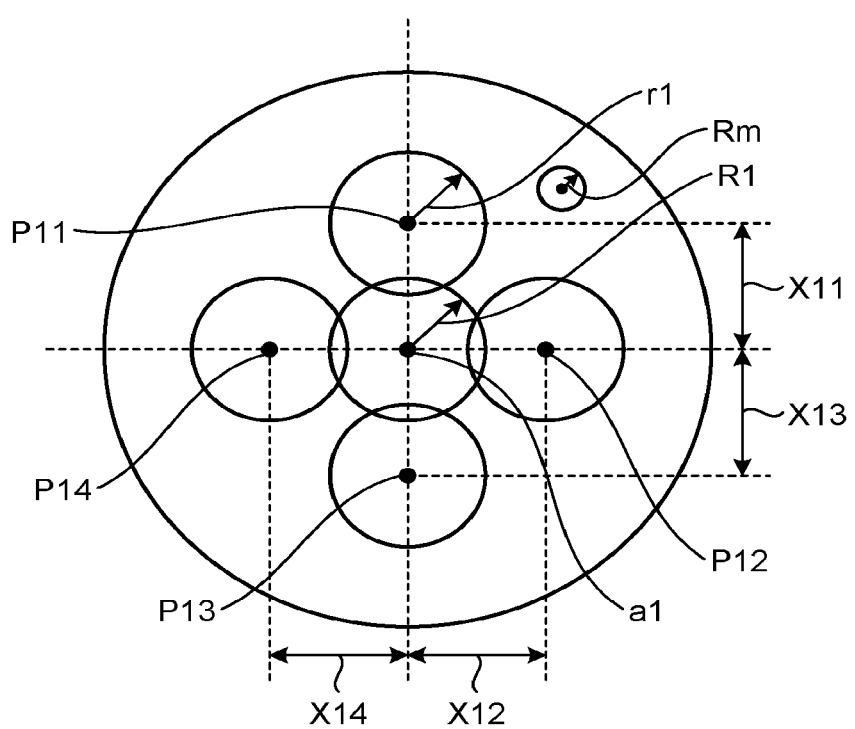
FIG. 10 is a diagram for explaining positional relationship of cores in the multicore fiber preform illustrated in FIG. 9.

FIG. 10 is a diagram for explaining positional relationship of cores in the multicore fiber preform illustrated in FIG. 9. As illustrated in FIG. 10, the multicore fiber preform 1 includes the four first core rods 2 in a cylindrical shape with the radius r1, the second core rod 3 having a cylindrical shape with the radius R1, the cladding 4 formed on an outer circumference of the first core rods 2 and the second core rod 3, and at least one piece of the marker rode 41 in a cylindrical shape with the radius Rm. Other components are same as the first embodiment.

According to the fourth embodiment explained above, the marker rod 41 can be further arranged and, therefore, the plural first core portions 2a of the multicore fiber according to the fourth embodiment can be identified by using the marker rod 41.

Fifth Embodiment

Composition of Multicore Fiber Preform

Figure 11:
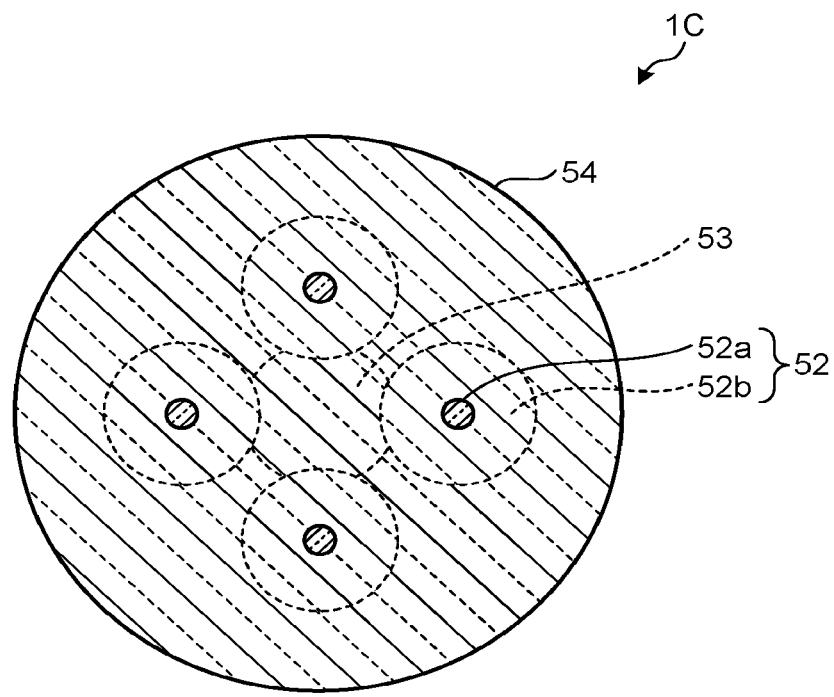
FIG. 11 is a cross-section of a multicore fiber preform that is manufactured by a manufacturing method of a multicore fiber preform according to a fifth embodiment of the present disclosure.

Next, a composition of a multicore fiber preform manufactured by a manufacturing method of a multicore fiber preform according to a fifth embodiment of the present disclosure will be explained. FIG. 11 is a cross-section of a multicore fiber preform that is manufactured by a manufacturing method of a multicore fiber preform according to the fifth embodiment of the present disclosure. As illustrated in FIG. 11, a multicore fiber preform 1C includes four first core rods 52, a low-temperature softening rod 53, and a cladding 54. The first core rods 52, the low-temperature softening rod 53, and the cladding 54 are integrated by the integration step described later. Although a case of having four pieces of the first core rods 52 is illustrated in FIG. 7, the number of the first core rods 52 is not particularly limited.

The first core rod 52 includes a first core portion 52a and a first cladding 52b that is formed on an outer circumference of the first core portion 52a. The low-temperature softening rod 53 has no core portion, and the refractive index thereof is uniform. The first core portion 52a is made from silica based glass having a high refractive index in which, for example, germanium is doped. The first cladding portion 52b, the low-temperature softening rod 53, and the cladding 54 are made from a material having a lower refractive index than the first core portion 52a. The first cladding portion 52b and the cladding 54 are made from, for example, pure silica glass in which no dopant for refractive index adjustment is added, or the like. The refractive indexes of the first cladding portion 52b, the low-temperature softening rod 53, and the cladding 54 may be the same, or be different from one another. Moreover, the low-temperature softening rod 53 may have a core portion.

Manufacturing Method of Multicore Fiber

Figure 12:
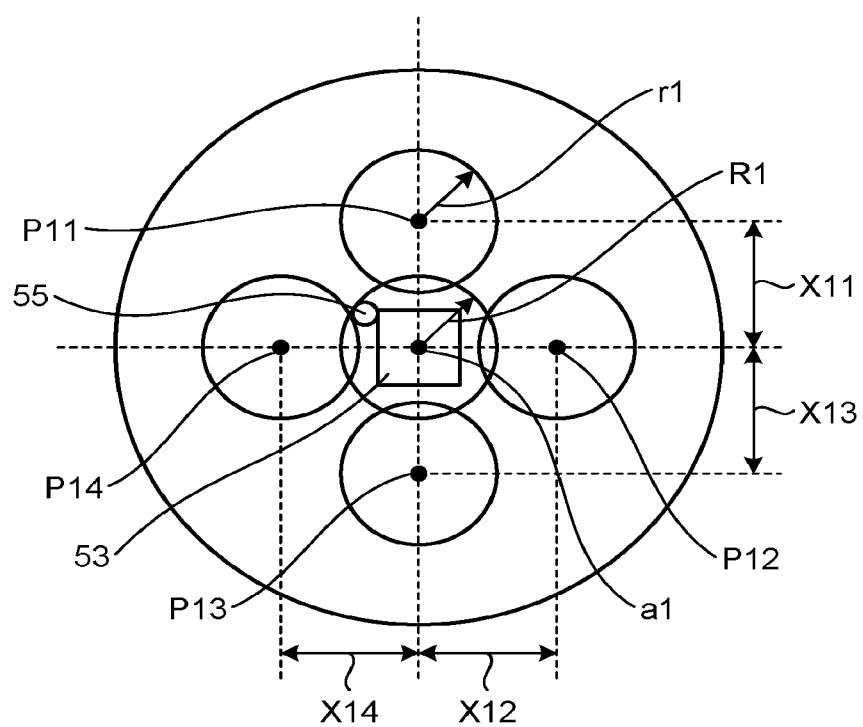
FIG. 12 is a diagram for explaining positional relationship of cores in the multicore fiber preform illustrated in FIG. 11.

Next, a manufacturing method of a multicore fiber to manufacture a multicore fiber by drawing the multicore fiber preform 1C manufactured by the manufacturing method of the multicore fiber preform 1C according to the fifth embodiment of the present disclosure will be explained. Because steps other than an abutting-surface forming step can be the same as those of the first embodiment, explanation thereof is omitted. FIG. 12 is a diagram for explaining positional relationship of cores in the multicore fiber preform illustrated in FIG. 11.

Around the same time or in parallel to steps S1 to S2 similarly to the first embodiment, the low-temperature softening rod 53 serving as a second rod having a thickness insertable in the second hole in a state in which all of the first core rods 52 in a cylindrical shape are inserted in the first holes is prepared. In other words, a size of a cross section of the low-temperature softening rod 53 is equal to or smaller than the size of the second hole in a state in which all of the first core rods 52 are inserted in the first holes. The low-temperature softening rod 53 is a cladding rod, a softening temperature of which is lower than that of the first cladding portion 52b and the cladding 54. The low-temperature softening rod 53 can have a lower softening temperature, which is a point of softening, by containing at least chlorine, phosphorus, and fluorine.

Subsequently, after inserting the first core rods 52 in the first holes, the low-temperature softening rod 53 is inserted in the second hole (step S4: insertion step). Thereafter, by performing step S5 similarly to the first embodiment, the low-temperature softening rod 53 melts first, and a gap in the second hole between itself and the first core rods 52 is filled by the low-temperature softening rod 53. Thereafter, those are integrated, and the multicore fiber preform 1C is manufactured. Furthermore, step S6 is performed similarly to the first embodiment, and the multicore fiber is manufactured.

A cross-sectional shape of the low-temperature softening rod 53 perpendicular to a longitudinal direction may be a circular shape, or a polygonal shape other than a quadrilateral shape. When the cross-sectional shape is a polygonal shape, it is preferable to be in a shape of an n-sided polygon corresponding to the number of the first core rods n (n: three or larger positive integer). That is, when the number of the first core rods 52 is n, the cross-sectional shape of the low-temperature softening rod 53 is preferable to be in the n-sided polygon. Moreover, it is preferable to be inserted such that sides of the n-sided polygon face positions of the first core rods 52. Thus, a gap between the first core rod 52 and the low-temperature softening rod 53 can be reduced. Moreover, a marker rod 55 can be inserted in a gap around the low-temperature softening rod 53 in the second hole.

Thus, in the multicore fiber according to the fifth embodiment, the points P11 to P1n are set so as to satisfy X1max−r1<R1<X1min at positions, distances of which are X11 to X1n, respectively, from the point a1 on straight lines dividing an end surface into n pieces, herein, four pieces (n=4), to have equal central axes, about the point a1 on the end surface, and the multicore fiber includes n pieces of first core regions (region corresponding to the first core rods 52) having a circular shape with the radius r1 that are arranged about the points P11 to P1n, and that include the first core portion 52a and the first cladding portion 52b formed on the outer circumference of the first core portion 52a, a second core region (region corresponding to the low-temperature softening rod 53) that is arranged about the point a1, and that has a lower softening temperature than the first classing portion 52b.

According to the fifth embodiment explained above, the low-temperature softening rod 53 having a lower softening temperature than the first cladding portion 52b and the cladding 54 is inserted in the second hole, and the low-temperature softening rod 53 melts first in the integration step to fill the second hole and, therefore, not only a step of flattening the first core rod 52 becomes unnecessary, but also misalignment is less prone to occur, and the positioning accuracy can be improved.

INDUSTRIAL APPLICABILITY

The present disclosure is suitable for applying to manufacturing of a multicore fiber having plural core portions.

According to an embodiment, it is possible to obtain an effect of a manufacturing method of a multicore fiber preform, a multicore fiber preform, and a multicore fiber that improve the positioning accuracy of cores, reduce the degree of core being non-circular shape, and improve the flexibility in designing can be achieved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A multicore fiber comprising:
n pieces of first core regions in a circular shape with a radius r1 that are arranged about points P11 to P1$n$, and that has a first core portion and a first cladding portion formed on an outer circumference of the first core portion by setting the points P11 to P1$n$ at positions, distances of which are X11 to X1$n$, respectively, from a point a1, on straight lines dividing an end surface in to n pieces to have an equal central angle about the point a1 of the end surface such that X1max−r1<R1<X1min is satisfied, where a maximum value of X11 to X1$n$ is X1max, and a minimum value thereof is X1min;
a second core region in a circular shape with a radius R1 that is arranged about the point a1, and that has a second core portion and a second cladding portion formed on an outer circumference of the second core portion; and
a cladding region that is formed on outer circumferences of the first core region and the second core region, wherein;
abutting surfaces that are flat surfaces abutting on each other are formed in portions on the outer circumferences of the first core region and the second core region, and
another cladding region having a softening temperature lower than the first cladding portion and the cladding region is arranged in place of the second core region.

2. A multicore fiber comprising:
n pieces of first core regions in a polygonal shape that are arranged to have a center of gravity at points P21 to P2$n$, and that has a first core portion and a first cladding portion formed on an outer circumference of the first core portion, by setting the points P21 to P2$n$ at positions, distances of which are X21 to X2$n$, respectively, from a point a2, on straight lines dividing an end surface into n pieces to have an equal central angle about the point a2 of the end surface such that a plurality of overlap portions in which adjacent polygons overlap each other at least in a part thereof are formed;
a second core region in a polygonal shape that is arranged about the point a1, that has a second core portion and a second cladding portion formed on an outer circumference of the second core portion, and that includes all of the overlap portions; and
a cladding region that is formed on an outer circumferences of the first core region and the second core region, wherein
abutting surfaces that are flat surfaces abutting on each other are formed in portions on the outer circumferences of the first core region and the second core region, and
another cladding region having a softening temperature lower than the first cladding portion and the cladding region is arranged in place of the second core region.

* * * * *